United States Patent [19]
Godlew et al.

[11] Patent Number: 5,911,643
[45] Date of Patent: Jun. 15, 1999

[54] DIFFERENTIAL GEAR MECHANISM AND IMPROVED BALL-RAMP ACTUATION THEREOF

[75] Inventors: David P. Godlew, Beverly Hills; David M. Preston, Clarkston, both of Mich.

[73] Assignee: Eaton Corporation, Cleveland, Ohio

[21] Appl. No.: 09/002,526

[22] Filed: Jan. 2, 1998

[51] Int. Cl.⁶ .................................................. F16H 48/30
[52] U.S. Cl. ................................................................ 475/150
[58] Field of Search ........................................... 475/150

[56] References Cited

U.S. PATENT DOCUMENTS

| | | | |
|---|---|---|---|
| Re. 33,742 | 11/1991 | Blessing et al. | 475/150 |
| 4,700,823 | 10/1987 | Winkler | 192/107 M |
| 4,781,078 | 11/1988 | Blessing et al. | 475/150 |
| 4,805,486 | 2/1989 | Hagiwara et al. | 74/710.5 |
| 5,019,021 | 5/1991 | Janson | 475/150 |
| 5,092,825 | 3/1992 | Goscenski et al. | 475/150 |
| 5,156,578 | 10/1992 | Hirota | 475/150 |
| 5,269,730 | 12/1993 | Hirota | 475/150 |
| 5,322,484 | 6/1994 | Reuter et al. | 475/150 |
| 5,326,333 | 7/1994 | Nizawa et al. | 475/150 |
| 5,464,084 | 11/1995 | Aoki et al. | 475/150 |
| 5,713,445 | 2/1998 | Davis et al. | 192/35 |

*Primary Examiner*—Dirk Wright
*Attorney, Agent, or Firm*—L. J. Kasper

[57] ABSTRACT

A differential gear mechanism including a clutch assembly (35) for retarding rotation between a side gear (23) and a gear case (11,45), and a ball ramp actuator for actuating the clutch assembly. The ball ramp actuator includes an inner actuating plate (49) within the gear case, and an outer actuating plate (51) disposed external to the gear case. In order to initiate ramp up of the ball ramp device, an electromagnetic coil assembly (67) includes an annular coil (75) which is disposed in face-to-face relationship with the outer actuating plate (51). An annular drive plate (83) is disposed between the coil (75) and the outer actuating plate (51), and is drawn into frictional engagement with a layer of friction material (81) upon energization of the coil. The drive plate (83) is connected by pins (89) to be axially movable relative to the outer actuating plate, but fixed to rotate therewith, such that frictional engagement of the drive plate (83) retards rotation of the outer actuating plate (51).

12 Claims, 3 Drawing Sheets

DIFFERENTIAL GEAR MECHANISM AND IMPROVED BALL-RAMP ACTUATION THEREOF

BACKGROUND OF THE DISCLOSURE

The present invention relates to limited slip differentials (LSDs), and more particularly, to such differentials of the type in which the means for retarding differentiating action may be modulated in response to an external input signal, and especially, an electrical input signal.

Limited slip differentials of the type to which the present invention relates typically include a gear case defining a gear chamber, and disposed therein, a differential gear set including at least one input pinion gear, and a pair of output side gears. A clutch pack is typically disposed between at least one of the side gears and an adjacent surface of the gear case, such that the clutch pack is operable to retard, or even prevent, relative rotation between the gear case and the one side gear. Although the present invention is not limited only to limited slip differentials in which the clutch pack is disposed axially between one of the side gears and an adjacent surface of the gear case, the present invention is especially advantageous when used in connection with an LSD having such an arrangement, and the invention will be described in connection therewith.

In many LSDs, some sort of actuating mechanism is provided to actuate or move the clutch pack from its disengaged condition to an engaged condition. One of the current trends in the field of vehicle traction modifiers involves the need to be able to actuate the clutch pack in response to an external input signal, rather than for the clutch pack to be actuated only in response to the sensing of a predetermined speed differential, as has typically been the case in the prior art.

One prior art approach to providing the ability to modulate an LSD has been by imposing a load on a clutch pack in response to the ramping of a ball-ramp actuator. In U.S. Pat. No. 4,805,486, the ball-ramp actuator is disposed externally to the differential case, and ramping of the actuator is initiated by rotation of a servomotor, and by means of a parallel-shaft gear train, thus requiring substantial redesign of the surrounding differential housing.

In U.S. Pat. Nos. 5,019,021 and 5,092,825, both of which are assigned to the assignee of the present invention and incorporated herein by reference, the ball-ramp actuator is built into the end wall of the differential housing. The ball-ramp actuator includes one actuating plate disposed within the differential housing, and another actuating plate disposed external to the differential housing. Each of the actuating plates includes appropriate ramps, and the cam balls engaging the ramps are disposed in openings defined by the end wall of the differential housing.

The above-incorporated patents provide a limited slip differential which is fairly simple and compact, and wherein the presence of the ball-ramp actuator for the clutch pack does not require substantial redesign of the differential.

However, in the above-incorporated patents, the actuator arrangement for initiating ramp-up of the ball-ramp actuator involves the use of an electromagnetic device operable to frictionally engage the outer periphery of the actuating plate external to the differential housing, thus retarding its rotation, relative to the differential, to initiate ramp up. It will be appreciated by those skilled in the art that frictional engagement of the actuating plate, at one location on its periphery, will result in an unbalanced radial load on both the actuating plate and the differential generally.

In addition, the arrangement of the incorporated patents provides relatively little frictional engagement area, thus necessitating an undesirably high engagement force in order to achieve the required retarding of the actuating plate. However, such a high engagement force is difficult to achieve in the arrangement described, because it involves a fairly long travel of the electromagnetic device, and, as is well known to those skilled in the art, force decreases as travelled distance increases. Another related problem is the difficulty of controlling the air gap between the actuator and the actuating plate periphery, and as is also well known, variations in the air gap cause major variations in performance.

Finally, the arrangement described requires an actuator housing for the electromagnetic device, with the housing being disposed transversely offset from the axis of the differential. Such an arrangement requires that the outer differential housing be modified substantially to accommodate the actuator housing, which adds another source of error in regard to the location of the actuator, relative to the actuating plate periphery.

BRIEF SUMMARY OF THE INVENTION

Accordingly, it is an object of the present invention to provide an improved limited slip differential of the type in which the clutch pack may be actuated, in a modulating fashion, in response to an external input signal, wherein the differential overcomes the problems associated with the prior art devices.

More specifically, it is an object of the present invention to provide an improved limited slip differential in which the actuator for initiating ramp up of the ball-ramp actuator does not apply an unbalanced, radial force to the drive plate disposed external to the differential housing, but instead, applies only a balanced force, and one which is applied only circumferentially to the actuating plate.

It is another object of the present invention to provide such an improved limited slip differential in which a relatively large area of frictional engagement is available, thus reducing the amount of force per unit area which is required, in order to initiate ramp up of the ball-ramp actuator.

Finally, it is an object of the present invention to provide such an improved limited slip differential in which the air gap within the actuator may be substantially reduced, for better electromagnetic performance, with the dimension of the air gap being maintained more consistently.

The above and other objects of the invention are accomplished by the provision of an improved differential gear mechanism of the type including a gear case defining an axis of rotation and a gear chamber. A differential gear means is disposed in the gear chamber and includes at least one input gear and first and second output gears. There is a means limiting differentiating action of the differential gear means in response to an electrical input signal, the limiting means including clutch means operable between a disengaged condition and an engaged condition, effective to retard relative rotation between the output gear and the gear case. Included is an actuating means for the clutch means, comprising first and second generally annular actuating plates defining a ball and ramp actuator, wherein relative rotation of the second actuating plate from an unactuated condition to an actuated condition is effective to bias the clutch means toward its engaged condition. The actuating means further comprises a stationary electromagnetic coil assembly operable to receive the electrical input signal and generate an electromagnetic field operable to retard rotation of the second actuating plate.

The improved differential gear mechanism is characterized by the electromagnetic coil assembly being generally annular and disposed in a face-to-face relationship with the second actuating plate, and defining therebetween an axial gap. An annular drive plate is disposed in the axial gap between the second actuating plate and the electromagnetic coil assembly. The mechanism includes means operable to interconnect the second actuating plate and the annular drive plate, whereby the plates are fixed to rotate in unison, but the drive plate is free to move axially within the axial gap, relative to the second actuating plate, and engage a friction surface of the electromagnetic coil assembly.

DETAILED DESCRIPTION OF THE PREFERRED EMBODIMENT

Figure 1:
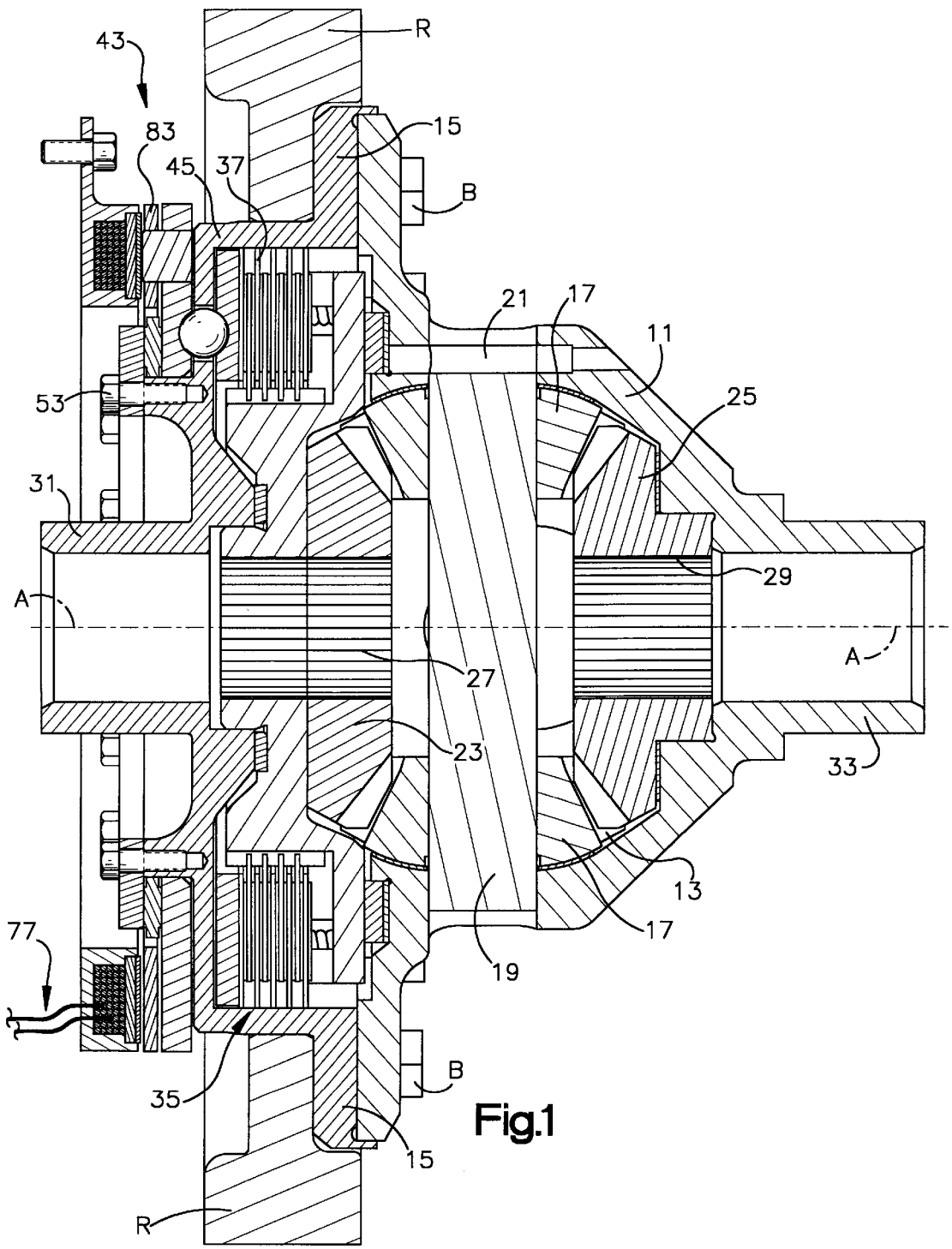
FIG. 1 is an axial cross-section of a limited slip differential made in accordance with the present invention.

Referring now to the drawings, which are not intended to limit the invention, FIG. 1 is an axial cross-section of a limited slip differential of the type with which the present invention may be utilized. The construction and operation of the LSD illustrated in FIG. 1 may be better understood by a reference to above-incorporated U.S. Pat. No. 5,092,825.

The differential gear mechanism includes a gear case 11 which defines therein a gear chamber, generally designated 13. Torque input to the differential mechanism is typically by means of an input ring gear R which may be attached to a flange 15 of the gear case 11 by any suitable means, such as a plurality of bolts B.

Disposed within the gear chamber 13 is a differential gear set including a pair of input pinion gears 17 which are rotatably mounted on a pinion shaft 19. Typically, the pinion shaft 19 is secured relative to the gear case 11 by any suitable means, such as a locking pin 21. The pinion gears 17 comprise the input gears of the differential gear set, and are in meshing engagement with a pair of side gears 23 and 25. The side gears 23 and 25 define sets of internal, straight splines 27 and 29, respectively, which are adapted to be in splined engagement with mating external splines of a pair of axle shafts (not shown). The gear case 11 includes annular hub portions 31 and 33, on which may be mounted a pair of bearing sets (not shown herein) which are used to provide rotational support for the differential mechanism relative to an outer differential housing (not shown herein).

As is well known to those skilled in the art, during normal, straight-ahead operation of the vehicle, no differentiation occurs between the left and right side gears 23 and 25, and therefore, the pinion gears 17 do not rotate relative to the pinion shaft 19. The gear case 11, the pinion gears 17, and the side gears 23 and 25 all rotate about an axis of rotation A as a solid unit.

Under certain operating conditions, such as when the vehicle is turning, or a slight difference in the tire size exists, is permissible for a certain amount of differentiating action to occur between the side gears 23 and 25. Above a certain, predetermined differential between the speeds of the side gears 23 and 25, it is desirable to retard the relative rotation between the gear case 11 and the side gears, in order to prevent excessive differentiating action, which could lead to a spin-out of one of the drive wheels, which could result in loss of control of the vehicle. There may also be operating conditions wherein it is desirable to actuate the differential mechanism to limit, or even prevent differentiating action, even before such action has a chance to occur.

In order to retard differentiating action, the limited slip differential is provided with a clutch pack, generally designated 35, including four clutch discs 37 (see FIG. 2) which are in engagement with the gear case 11, and four clutch discs 39 which are splined to a member 41 disposed adjacent the side gear 23, and fixed to rotate therewith by virtue of cooperating in defining the straight, internal splines 27, and perhaps by other suitable means to make the member 41 and side gear 23 non-rotatable relative to each other. It will be recognized by those skilled in the art that the member 41 and the side gear 23 could comprise a single, unitary member.

In the subject embodiment, the clutch pack 35 is of the type referred to as "gear inactive", i.e., the clutch pack 35 is not engaged in response to gear reaction forces transmitted from the pinion gear 17 to the side gear 23 during differentiating action. Instead, there is an actuation mechanism, generally designated 43 disposed adjacent the left end (in FIGS. 1 and 2) of the clutch pack 35. The general function of the actuation mechanism 43 is to apply an axial load or force to the clutch pack 35, operable to move the clutch pack 35 from its disengaged position shown in FIGS. 1 and 2 to an engaged position, retarding rotation of the side gear 23 and member 41, relative to the gear case 11.

As is well known to those skilled in the art, the "movement" of the clutch pack 35 between the disengaged and the engaged positions may actually involve very little movement, but instead, may require only an increase in the compressive loading on the clutch pack. In other words, references herein, and in the appended claims to the clutch pack being in its "disengaged" position will be understood to include those situations wherein the clutch discs 37 and 39 may literally be "in engagement" in the sense that they are touching, but are considered to be in a disengaged position because they are not subjected to sufficient axial loading for the clutch pack to be able to transmit any substantial retarding torque. It is believed that the above explanation is well known to those skilled in the art, and should not require any further discussion.

Figure 2:
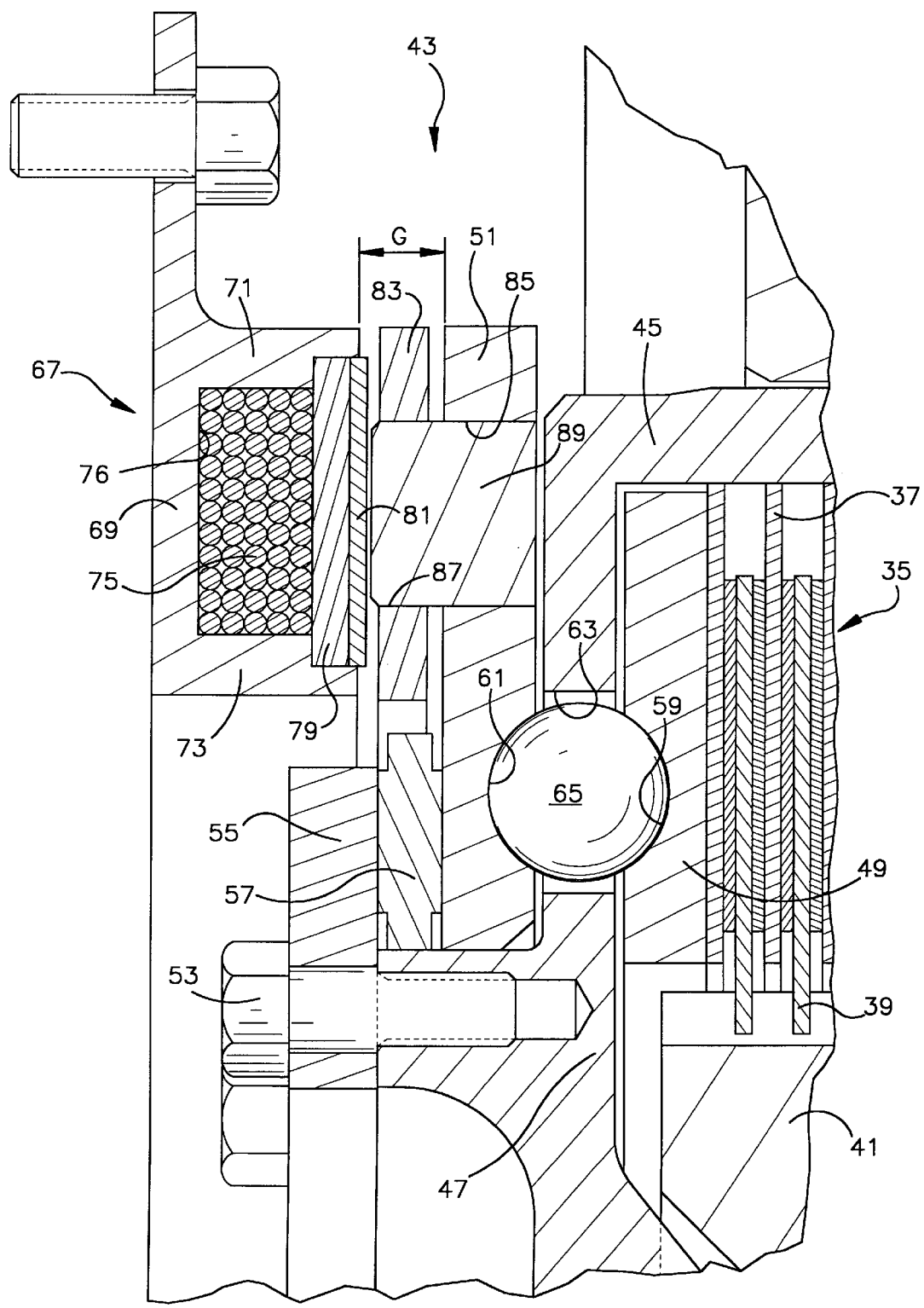
FIG. 2 is an enlarged, fragmentary, axial cross-section similar to FIG. 1, illustrating primarily the electromagnetic actuator of the present invention.

Referring now primarily to FIG. 2, the actuation mechanism 43 will be described in greater detail. The gear case 11 includes a left hand case portion 45 (shown also in FIG. 1), including an end wall 47. In accordance with the teachings of above-incorporated U.S. Pat. No. 5,092,825, a portion of the actuation mechanism 43 is disposed within the gear case 11 (to the right of the end wall 47), and the remainder of the mechanism 43 is disposed external to the gear case 11 (to the left of the end wall 47).

The actuation mechanism 43 includes an annular, inner actuating plate 49 disposed within the gear case 11, and an annular, outer actuating plate 51 disposed external to the gear case 11. Attached to the left hand case portion 45, by means of a plurality of bolts 53, is an annular bearing plate 55, and disposed axially between the bearing plate 55 and the outer actuating plate 51 is an annular thrust bearing 57. Thus, the outer actuating plate 51 is restrained against axial movement from the position shown in FIG. 2.

Referring still primarily to FIG. 2, the inner actuating plate 49 defines a plurality of ramp surfaces 59, and the outer actuating plate 51 defines a plurality of ramp surfaces 61.

In the subject embodiment, there are three of the ramp surfaces 59 and three of the ramp surfaces 61, and in the disengaged position shown in FIG. 2, each of the ramp surfaces 59 is substantially circumferentially aligned with one of the ramp surfaces 61. Furthermore, the deepest portion of each of the ramp surfaces 59 and 61 is circumferentially aligned with an opening 63 formed in the end wall 47, such that in the subject embodiment there are also three of the openings 63. Disposed within each of the openings 63, and in engagement with each adjacent ramp surface 59 and 61 is a cam ball 65. Preferably, the opening 63 is somewhat oversized relative to its cam ball 65, in accordance with the teachings of the above-incorporated U.S. Pat. No. 5,092,825.

The plates 49 and 51, the ramp surfaces 59 and 61, and the openings 63 and cam balls 65 together comprise a device which is typically referred to as a "ball-ramp actuator", the function of which is to translate a relatively low torque retarding rotation applied to the outer plate 51 into a relatively high loading force applied axially by the inner plate 49 against the clutch pack 35.

In accordance with an important aspect of the present invention, there is provided an electromagnetic coil assembly, generally designated 67, the function of which is to exert the required retarding torque on the outer actuating plate 51, thus initiating ramp-up of the ball-ramp actuator, and loading of the clutch pack 35.

Figure 3:
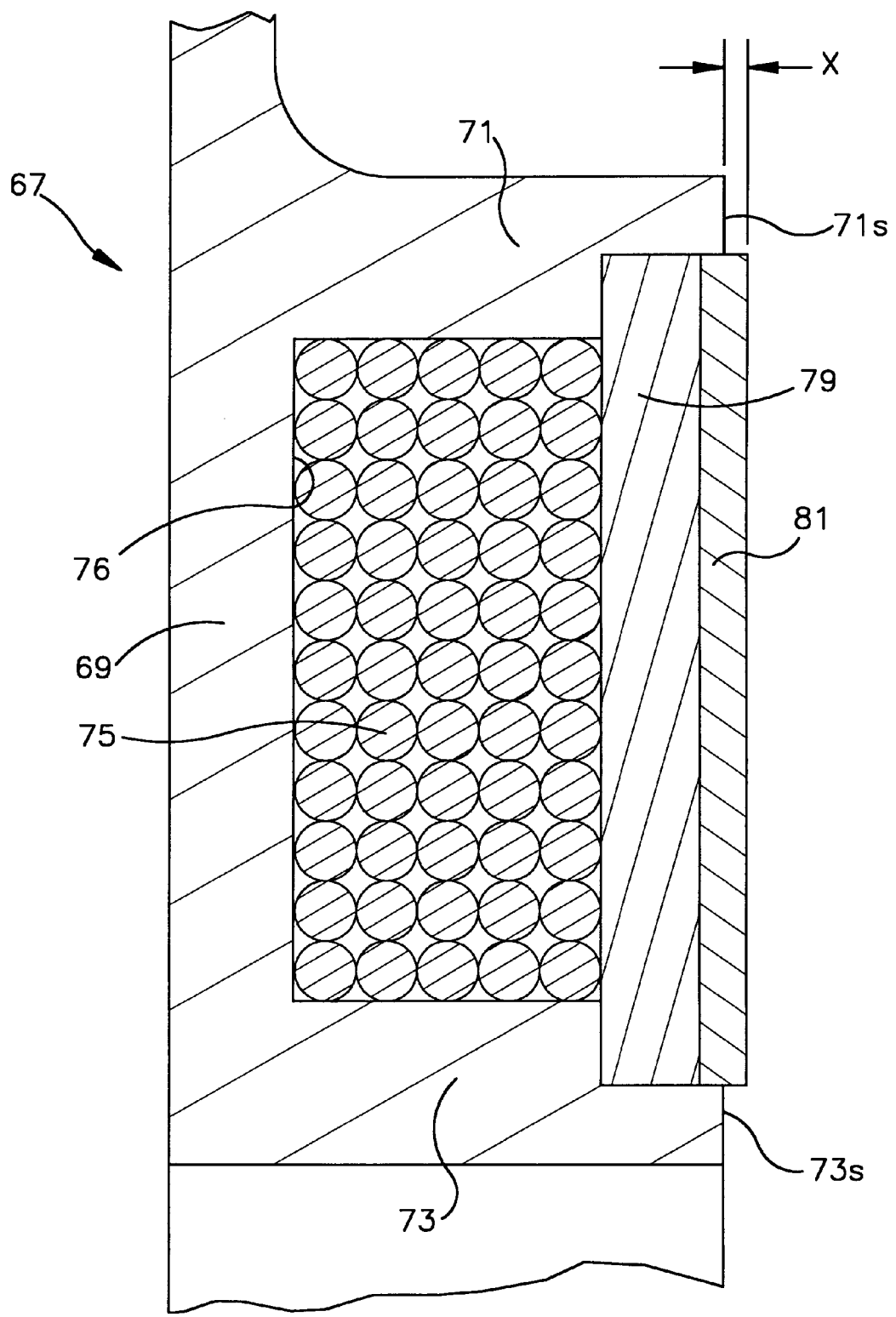
FIG. 3 is a further enlarged, fragmentary, axial-cross section similar to FIGS. 1 and 2, illustrating the electromagnetic coil assembly in greater detail.

Referring now to FIG. 3, in conjunction with FIGS. 1 and 2, the coil assembly 67 is generally annular, and is concentric, about the axis of rotation A, with certain of the elements already described, such as the actuating plates 49 and 51. The coil assembly 67 includes an annular coil housing 69, including a radially outer wall portion 71, and a radially inner wall portion 73. Disposed within the coil housing 69 is an electromagnetic coil 75, which may be a fairly conventional coil, and may be connected to a source of electrical current by means of a set of electrical leads 77, shown only schematically, and only in FIG. 1.

The outer and inner wall portions 71 and 73 cooperate with the coil 75 to define an annular recess 76, and disposed therein is an assembly comprising an annular, austenitic stainless steel spacer 79, and an annular layer of a friction material 81. The spacer 79 needs to comprise a non-magnetic material, so that the flux path does not pass through the spacer 79, for reasons which are understood by those skilled in the art. Preferably, the friction material 81 comprises a single layer of pyrolytic carbon friction material made in accordance with the teachings of U.S. Pat. No. 4,700,823, assigned to the assignee of the present invention and incorporated herein by reference. Pyrolytic carbon is preferred because it has been found to have especially good wet friction characteristics, the static and dynamic coefficients of friction are quite similar, and it has wear characteristics and power absorption characteristics (under slipping conditions) which are especially adapted for this device, as will be explained in greater detail subsequently.

Disposed within an axial gap G (see FIG. 2) between the layer of friction material 81 and the outer actuating plate 51 is an annular drive plate 83. The outer actuating plate 51 defines a plurality of circular openings 85, and the drive plate 83 defines a plurality of circular openings 87, and disposed in each adjacent pair of openings 85 and 87 is a drive pin 89. Preferably, the drive pin 89 is in a press-fit relationship within the opening 85, whereas the opening 87 is slightly oversized relative to the drive pin 89, such that the drive plate 83 can move axially relative to the plate 51, but is restrained from moving any substantial distance circumferentially relative to the plate 51.

Referring now primarily to FIG. 3, the outer and inner wall portions 71 and 73 include surfaces 71s and 73s, respectively, and in accordance with one important aspect of the invention, the layer of friction material 81 extends axially a distance X beyond the surfaces 71s and 73s. The distance X is preferably selected, relative to the rate of wear of the friction material 81, such that the drive plate 83 will engage only the friction material 81 over at least a major portion of the likely useful life of the differential.

Operation

When there is no input signal on the leads 77, and the coil 75 is de-energized, the drive plate 83 is disengaged from the coil assembly 67, and the entire ball-ramp actuator remains in its centered or neutral condition shown in FIG. 2, such that the clutch pack 35 is in its disengaged position.

Whenever an impending spin-out condition is sensed, or for whatever other reason, it is desired to engage the clutch pack 35, an appropriate input signal 77 is transmitted to the coil 75. With the coil 75 energized, electromagnetic lines of flux form a flux path passing through the coil housing 69, through the outer wall portion 71, through the drive plate 83, and through the inner wall portion 73. The flux path causes the drive plate 83 to be attracted to the left in FIG. 2, into frictional engagement with the friction material 81. As soon as this frictional engagement occurs, the result is that, even if the drive plate 83 slips relative to the stationary coil assembly 67, rotation of the drive plate 83 is at least somewhat retarded, relative to the rest of the ball-ramp actuator. However, the presence of the drive pins 89, interconnecting the drive plate 83 and the outer actuating plate 51, also results in the rotation of the plate 51 being retarded, thus initiating ramp-up of the inner actuating plate 49 and cam balls 65, relative to the outer actuating plate 51.

After the differential has operated in the engaged condition a large number of times, the friction material 81 could eventually wear to the extent that it no longer extends axially very far beyond the surfaces 71s and 73s of the wall portions 71 and 73. At that point, whenever the coil 75 is energized, and the drive plate 83 is drawn toward the coil assembly 67, the radially outer and radially inner portions of the drive plate 83 will be much closer to the surfaces 71s and 73s. When this occurs, there will be a reduced air gap between the surfaces 71s and 73s and the drive plate 83. In other words, the flux gap between the housing 69 and the drive plate 83 approaches zero, thus increasing the retarding force exerted on the drive plate 83.

It may be seen that the present invention provides an improved LSD in which substantially the only force on the actuating plate 51 is that exerted in the circumferential direction by the drive pins 89 when the coil 75 is energized. In addition, the invention provides an improved LSD in which there is a relatively large frictional surface available, thus reducing the force per unit area required to initiate retarding of the actuating plate 51. The performance of the device is improved because of the relatively small travel required to achieve engagement, and the ability to control accurately the air gap across which the flux lines must pass. Finally, the friction material effectively controls the air gap and thus, a maximum clamping load, of the drive plate against the friction material, can be assured.

In terms of packaging of the differential, the present invention results in a device in which substantially all of the elements of the actuation mechanism 43 are annular, and concentric about the axis of rotation A of the differential. This aspect of the invention greatly simplifies the packaging of the differential within the outer differential housing.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A differential gear mechanism of the type including a gear case defining an axis of rotation and a gear chamber; differential gear means disposed in said gear chamber including at least one input gear and first and second output gears; means for limiting differentiating action of said differential gear means in response to an electrical input signal, said limiting means including clutch means operable between a disengaged condition and an engaged condition, effective to retard relative rotation between said output gear and said gear case; actuating means for said clutch means, comprising first and second generally annular actuating plates defining a ball and ramp actuator, wherein relative rotation of said second actuating plate from an unactuated condition to an actuated condition is effective to bias said clutch means toward said engaged condition; said actuating means further comprising a stationary electromagnetic coil assembly operable to receive said electrical input signal and generate an electromagnetic field operable to retard rotation of said second actuating plate; characterized by:

(a) said electromagnetic coil assembly being generally annular and disposed in a face-to-face relationship with said second actuating plate, and defining therebetween an axial gap;

(b) an annular drive plate disposed in said axial gap between said second actuating plate and said electromagnetic coil; and (c) means operable to interconnect said second actuating plate and said annular drive plate, whereby said plates are fixed to rotate in unison, but said drive plate is free to move axially within said axial gap, relative to said second actuating plate, and engage a friction surface of said electromagnetic coil assembly.

2. A differential gear mechanism as claimed in claim 1, characterized by said second actuating plate being disposed, in said unactuated condition, to rotate with said gear case.

3. A differential gear mechanism as claimed in claim 2, characterized by said ball and ramp actuator comprising a plurality of cam balls, and each of said first and second actuating plates defining a plurality of ramp surfaces.

4. A differential gear mechanism as claimed in claim 3, characterized by said gear case including an end wall disposed between said first and second actuating plates, and oriented generally perpendicular to said axis of rotation, said end wall defining a plurality of openings, each of said openings having one of said cam balls disposed therein.

5. A differential gear mechanism as claimed in claim 1, characterized by means disposed within said gear case and operable to transmit axial movement of said ball and ramp actuator to move said clutch means toward said engaged condition.

6. A differential gear mechanism as claimed in claim 5, characterized by said means to move said clutch means comprises said first actuating plate.

7. A differential gear mechanism as claimed in claim 1, characterized by said electromagnetic coil assembly comprising an annular housing member disposed on a radially inner and a radially outer surface of said coil, and including a layer of friction material disposed on a forward surface of said coil assembly facing said drive plate.

8. A differential gear mechanism as claimed in claim 7, characterized by said friction material comprising a single layer of a pyrolytic carbon friction material, extending axially from said housing member a distance X, whereby, said drive plate engages only said friction material upon energization of said coil assembly.

9. A differential gear mechanism as claimed in claim 1, characterized by said interconnecting means comprises a plurality of elongated members oriented generally parallel to said axis of rotation, said elongated members being fixed to move axially with one of said second actuating plate and said drive plate, and received within openings defined by the other of said second actuating plate and said drive plate for relative axial movement therebetween.

10. A differential gear mechanism as claimed in claim 9, characterized by said elongated members comprising generally cylindrical drive pins fixed to move axially with said second actuating plate and said openings comprising circular openings defined by said drive plate, whereby energization of said electromagnetic coil by said electrical input signal results in axial movement of said drive plate into frictional engagement with said electromagnetic coil assembly.

11. A differential gear mechanism as claimed in claim 10, characterized by said electromagnetic coil assembly comprising an annular housing member including a radially outer and a radially inner portion surrounding said coil, and including a layer of friction material disposed on a forward surface of said coil assembly facing said drive plate.

12. A differential gear mechanism as claimed in claim 11, characterized by said annular housing member for said coil assembly being configured whereby, when said layer of friction material is in engagement with said drive plate, the air gap between said annular housing member and said drive plate is controlled thereby.

\* \* \* \* \*